US010587842B1

(12) United States Patent
Fadili et al.

(10) Patent No.: US 10,587,842 B1
(45) Date of Patent: Mar. 10, 2020

(54) VIDEOCONFERENCE SERVER, CLIENT DEVICE, VIDEOCONFERENCE SYSTEM AND METHOD

(71) Applicant: ALE INTERNATIONAL, Colombes (FR)

(72) Inventors: Moulay Fadili, Cergy (FR); Benoît Trinite, Montesson (FR); Emmanuel Helbert, Andlau (FR)

(73) Assignee: ALE INTERNATIONAL, Colombes (FR)

( * ) Notice: Subject to any disclaimer, the term of this patent is extended or adjusted under 35 U.S.C. 154(b) by 0 days.

(21) Appl. No.: 16/346,819

(22) PCT Filed: Jan. 6, 2017

(86) PCT No.: PCT/IB2017/050051
§ 371 (c)(1),
(2) Date: May 1, 2019

(87) PCT Pub. No.: WO2018/091976
PCT Pub. Date: May 24, 2018

(30) Foreign Application Priority Data

Nov. 18, 2016 (EP) .................................... 16306515

(51) Int. Cl.
*H04N 7/15* (2006.01)
*H04L 29/06* (2006.01)
(Continued)

(52) U.S. Cl.
CPC ........... *H04N 7/152* (2013.01); *H04L 65/403* (2013.01); *H04M 3/567* (2013.01); *H04N 7/147* (2013.01)

(58) Field of Classification Search
CPC combination set(s) only.
See application file for complete search history.

(56) References Cited

U.S. PATENT DOCUMENTS

| 9,338,213 B2 * | 5/2016 | Civanlar ............. H04L 12/4604 |
| 2006/0007943 A1 | 1/2006 | Fellman |

(Continued)

FOREIGN PATENT DOCUMENTS

| EP | 2728830 A1 | 5/2014 |
| EP | 2993855 A1 | 3/2016 |

OTHER PUBLICATIONS

International Search Report and Written Opinion with regard to PCT/IB2017/050051 dated May 26, 2017.
(Continued)

*Primary Examiner* — Phung-Hoang J Nguyen
(74) *Attorney, Agent, or Firm* — BCF LLP (57) ABSTRACT

The invention comprises a videoconference server (2) comprising: —an audio processing module (9) configured to, ○calculating an average audio processing delay of processing audio packets intended to the second client device, in order that the second client device may synchronize a received video packet with the associated received audio packet, —a video router (10) configured to: ○duplicate the video packet and temporarily store the duplicated video packet, ○receive a retrieving request from the second client device (4) for retrieving a lost video packet, ○retrieving the duplicated video packet associated with the identification information in the video buffer (17).

18 Claims, 3 Drawing Sheets

(51) Int. Cl.
*H04M 3/56* (2006.01)
*H04N 7/14* (2006.01)

(56) References Cited

U.S. PATENT DOCUMENTS

| | | |
|---|---|---|
| 2008/0034104 A1 | 2/2008 | Kariti et al. |
| 2012/0098923 A1 | 4/2012 | Westin |
| 2012/0140018 A1 | 6/2012 | Pikin et al. |
| 2014/0168354 A1 | 6/2014 | Clavel et al. |
| 2014/0233420 A1* | 8/2014 | Honda .................. H04L 65/605 370/252 |
| 2015/0029856 A1 | 1/2015 | Rozenberg |
| 2015/0042744 A1* | 2/2015 | Ralston ............... H04L 12/1827 348/14.02 |
| 2015/0222849 A1* | 8/2015 | Kang ...................... H04L 47/38 348/14.12 |
| 2016/0021149 A1 | 1/2016 | Maistri et al. |
| 2016/0255307 A1* | 9/2016 | Civanlar ............. H04L 12/4604 348/14.09 |
| 2016/0283860 A1 | 9/2016 | Pycock et al. |

OTHER PUBLICATIONS

International Preliminary Report on Patentability with regard to PCT/IB2017/050051 completed Jan. 28, 2019.
Supplementary European Search Report with regard to the EP Patent Application No. 17871343.4 dated Feb. 3, 2020.

* cited by examiner

VIDEOCONFERENCE SERVER, CLIENT DEVICE, VIDEOCONFERENCE SYSTEM AND METHOD

FIELD OF THE INVENTION

The invention relates to synchronization of audio and video signals in a videoconference system. In particular, the invention relates to a videoconference server, a client device and a method for synchronizing audio packets and video packets, especially for lip synchronization.

BACKGROUND

In Real Time Protocol (RTP) communications, videoconference servers receive audio packets and associated video packets incoming from a client device in order to route the audio and video packets to another client device. A videoconference server processes the received audio packets, for example by compressing a received audio packet and decompressing received compressed packets or by mixing several audio streams received from several client devices. Therefore, a processing delay is added to the transmission delay of the audio packets. In order to synchronize associated video packets to the audio packets, the processing delay is also applied to the video packets by the videoconference server in order to synchronize the video packets to the audio packets prior to sending the audio and video packets to a client device.

In the case where a video packet is lost in the transmission between an emitting client device and a receiving client device, one of the widely used techniques in real time video conferencing is the packet retransmission mechanism. In this mechanism a recovery request is sent from the receiving client device in order that the emitting client device re-sends the lost packet.

Therefore, the transmission delay for the lost video packet can exceed the maximum delay of lip synchronization in the receiving client device, which leads to the inefficiency of the retransmission mechanism.

SUMMARY

An idea at the basis of the invention is to improve the recovery of a lost video packet in a video communication session. An idea at the basis of the invention is to add flexibility in the transmission delay of video packets. An idea at the basis of the invention is to carry out the synchronization between an audio packet and a video packet in the client devices rather than in the videoconference server.

In an embodiment, the invention provides a videoconference server comprising
- a packet input interface configured to receive audio and associated video packets from a first client device,
- a packet output interface configured to send the received audio and associated video packets to a second client device,
- an audio processing module configured to, when the packet input interface receives an audio packet from the first client device,
  - processing the audio packet,
  - calculating an average audio processing delay of audio packets intended to the second client device,
  - associating the average audio processing delay to the second client device,
  - sending the average audio processing delay to the second client device in order that the second client device may synchronize a received video packet with the associated received audio packet,
- a video router comprising a video buffer configured to duplicate a video packet received by the packet input interface from the first client device, wherein the video packet is associated to the audio packet, and temporarily store the duplicated video packet in relation with an identification information of the video packet,
  - the video router being further configured to:
    - receive a retrieving request from the second client device for retrieving a lost video packet, the retrieving request comprising an identification information of the video packet,
    - retrieving the duplicated video packet associated with the identification information in the video buffer,
  - the packet output interface being further configured to send the retrieved duplicated video packet to the second client device.

Thanks to these features, the retransmission delay in the case where a packet is lost is improved. For example, thanks to these features, the lip synchronization is improved in a video conference.

According to embodiments, such a videoconference server may comprise one or more of the features below.

In embodiments, the video router is further configured to select a subset of the received video packets, and to send to the second client device only video packets of the selected subset of received video packets.

In embodiments, the video buffer is configured to duplicate all the video packets received in the packet input interface. Alternatively, the video buffer is configured to duplicate only video packets of the selected subset of received video packets.

In embodiments, the packet input interface is further configured to receive audio and associated video packets from the second client device, and the packet output interface is further configured to receive the received audio and associated video packets from the second client device to the first client device.

In embodiments, the video router is further configured to detect that a video packet initially sent by the first client device is not received by the packet input interface,
the video router being further configured to send a retrieving request to the first client device, and to receive from the first client device the initially sent video packet that has not been initially received.

In embodiments, the videoconference server further comprises:
- a client device configuration detection module configured to, prior the initiation of a communication session with the second client device, send a configuration request to the second client device,
- receiving a configuration response from the second client device, the configuration response comprising an indication whether the second client device is adapted to locally synchronize video packets with associated audio packets or not adapted,
- the videoconference server being further configured to, when the configuration response comprises an indication that the second client device is not adapted to locally synchronize video packets with associated audio packets,
  - delaying the received video packet by the calculated average audio processing delay prior to sending the received video packet to the second client device.

In embodiments, the videoconference server is further configured to, when the configuration response comprises an indication that the second client device is not adapted to locally synchronize video packets with associated audio packets,
    inhibiting the sending of the calculated average audio processing delay to the second client device.

In embodiments, the audio packets are identified by audio packet identifiers and the associated video packets are identified by video packet identifiers, the video buffer being configured to detect that a video packet initially sent by the first client device is not received by the packet input interface by controlling the video packet identifier of a received video packet and by comparing the video packet identifier to an expected video packet identifier, wherein the expected video packet identifier is associated with the audio packet identifier of a received audio packet to which the expected video packet is associated.

In embodiments, the audio and video packets are each identified by a packet number or sequence number, the packet number indicating the position of the packet in a sequence of emitted packets, wherein the retrieving request comprises the packet number or sequence number of the video packet.

In embodiments, processing the audio packet comprises mixing the audio packet with other received audio packets.

In embodiments, the audio processing module is configured to periodically recalculate the average audio processing delay and to send the recalculated average audio processing delay to the second client device in order that the second client device may update the average audio processing delay used to synchronize a received video packet with the associated received audio packet.

In embodiments, the video buffer is a circular buffer.

In embodiments, the packets are Real Time Protocol (RTP) packets.

The invention also provides a videoconference endpoint comprising
    an emitting interface configured to emit audio and associated video packets for a videoconference server,
    a receiving interface configured to receive audio and associated video packets from the videoconference server,
    a video buffer configured to temporarily store the received video packets,
    a synchronization module configured to receive an average audio processing delay from the videoconference server, and to delay the received video packets by the average audio processing delay in order to synchronize each video packet with a received audio packet associated to the video packet,
    a packet loss detector configured to detect that a video packet initially sent by the videoconference server is not received by the receiving interface,
    the packet loss detector being further configured to send a retrieving request to the videoconference server for retrieving a lost video packet, the retrieving request comprising an identification information of the video packet,
    the receiving interface being further configured to receive a duplication of the lost video packet in response to sending the retrieving request.

In embodiments, the packet loss detector is further configured to inhibit the delaying of the duplication of the video packet by the average audio processing delay.

In embodiments, the videoconference endpoint further comprises an audio speaker configured to render a voice signal carrier by the audio packets and a video display configured to display a video signal carrier by the received video packets, the video display being configured to display a portion of the video signal carried by a video packet associated with an audio packet at the same time that the audio speaker renders a portion of the voice signal carried by the associated audio packet. For example, the videoconference endpoint is a client device, such as a personal computer device, a digital screen device, a smartphone device etc.

The invention also provides a videoconference system comprising:
    a videoconference server comprising:
        a packet input interface configured to receive audio and associated video packets from a first client device,
        a packet output interface configured to send the received audio and associated video packets to a second client device,
        an audio processing module configured to, when the packet input interface receives an audio packet from a first client device,
            processing the audio packet,
            calculating an average audio processing delay of audio packets intended to the second client device,
            associating the average audio processing delay to the second client device,
            sending the average audio processing delay to the second client device in order that the second client device may synchronize a received video packet with the associated received audio packet,
        a video router comprising a video buffer configured to, duplicate a video packet received by the packet input interface from a first client device, wherein the video packet is associated to the audio packet, and temporarily store the duplicated video packet in relation with an identification information of the video packet,
        the video router being further configured to:
            receive a retrieving request from the second client device for retrieving a lost video packet, the retrieving request comprising an identification information of the video packet,
            retrieving the duplicated video packet associated with the identification information in the video buffer,
        the packet output interface being further configured to send the retrieved duplicated video packet to the second client device,
    the videoconference system further comprising,
    the second client device comprising
        an emitting interface configured to emit audio and associated video packets for the videoconference server,
        a receiving interface configured to receive audio and associated video packets from the videoconference server,
        a video buffer configured to temporarily store the received video packets,
        a synchronization module configured to receive an average audio processing delay from the videoconference server, and to delay the received video packets by the average audio processing delay in order to synchronize each video packet with a received audio packet associated to the video packet,
        a packet loss detector configured to detect that a video packet initially sent by the videoconference server is not received by the receiving interface,
    the packet loss detector being further configured to send a retrieving request to the videoconference server for retrieving a lost video packet, the retrieving request comprising an identification information of the video packet, the receiving interface being further configured to receive a duplication of the lost video packet in response to sending the retrieving request.

In an embodiment, the video router is further configured to forwarding the retrieving request to the first client in case the video packet is not available in the video buffer, dropping the retrieving request in case the lost video packet had already been detected by the video router, this detection having triggered the sending of a retrieving request by the video router towards the first client, In an embodiment, the packet loss detector is further configured to inhibit the delaying of the duplication of the video packet by the average processing audio delay.

The invention also provides a method for synchronizing audio and video packets from a first client device to a second client device, wherein the first client device and the second client device are involved in a video communication session, the method comprising:

receiving, in a videoconference server, audio packets and associated video packets from a first client device to be forwarded to a second client device, processing, in the videoconference server, the received audio packets and calculating an average audio processing delay of audio packets intended to the second client device, sending the processed audio packets to the second client device, duplicating and temporarily storing, in the videoconference server, at least some of the received video packets associated with the received audio packets, sending by the videoconference server the received video packets to the second client device, receiving, in the second client device, the processed audio packets and the video packets, sending, by the videoconference server, the calculated average audio processing delay to the second client device, delaying, by the second client device, the received video packets by the average audio processing delay.

In embodiments, the method further comprises retrieving a video packet that has not been received by the second client device, wherein retrieving comprises:

detecting, by the second client device, that a video packet sent by the videoconference server is not received, sending, by the second client device, a retrieving request for retrieving the video packet that has not been received, the retrieving request comprising an identification information of the video packet that has not been received, receiving, by the videoconference server, the retrieving request from the second client device, retrieving, by the videoconference server, the duplicated video packet associated with the identification information, sending the retrieved duplicated video packet to the second client device, receiving, by the second client device the retrieved duplicated video packet.

In embodiments, the method further comprises inhibiting, by the second client device, the delaying of the retrieved duplicated video packet by the average audio processing delay.

In embodiments, the method further comprises retrieving a video packet that has not been received by the videoconference server, wherein retrieving comprises:

detecting, by the videoconference server, that a video packet sent by the first client device is not received by the videoconference server, sending, by the videoconference server, a retrieving request to the first client device, wherein the retrieving request comprises an identification information of the video packet that has not been received, receiving, by the videoconference server, the video packet that has not been received.

In embodiments, the method further comprises inhibiting, by the second client device, the delaying of the retrieved video packet by the average audio processing delay.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
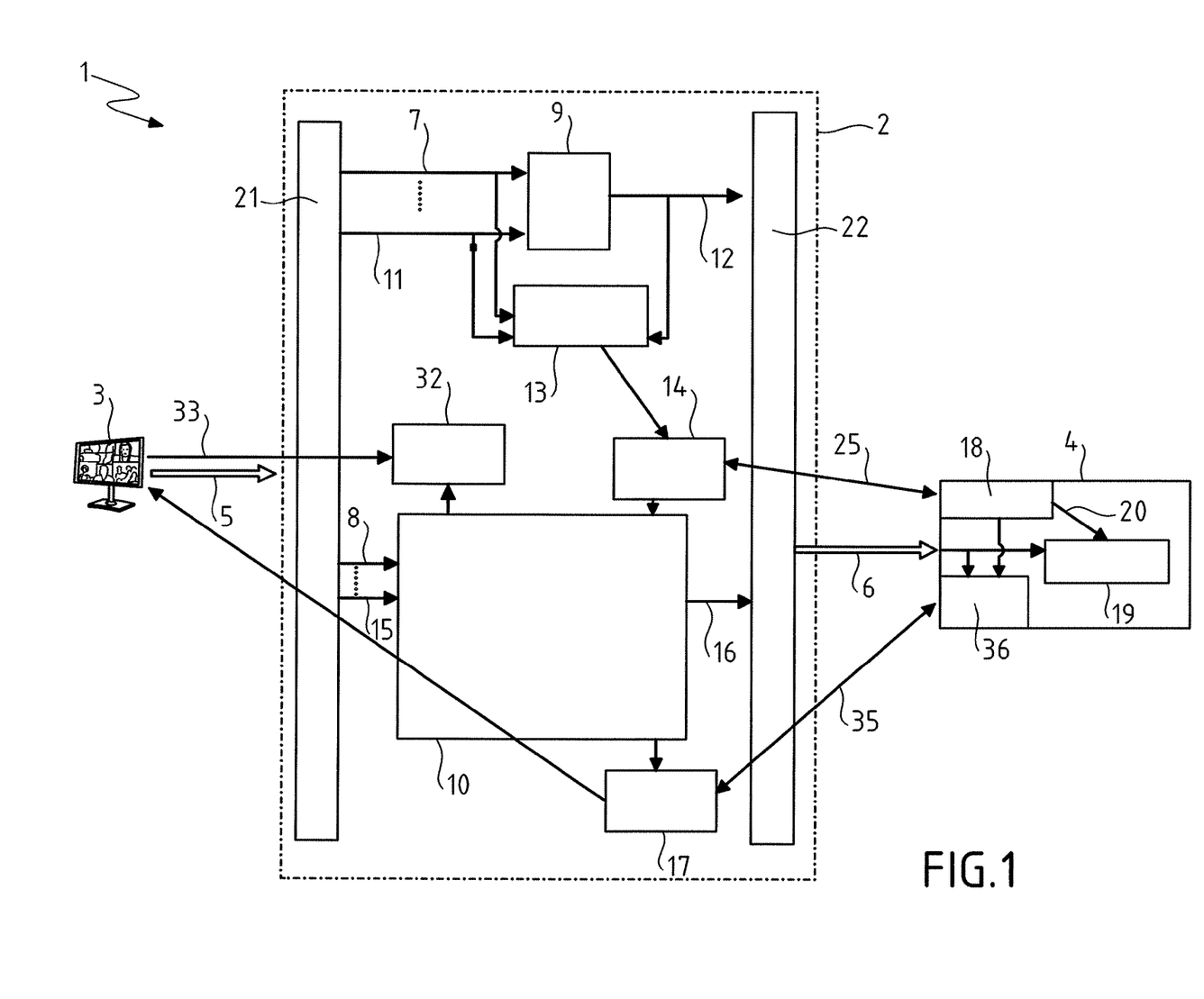
FIG. 1 schematically illustrates a videoconference system comprising a videoconference server, a first client device and a second client device, each involved in a videocommunication session.

FIG. 1 illustrates a videoconference system 1 comprising a videoconference server 2, a first client device 3 and a second client device 4.

For the sake of illustration, the videoconference system 1 represented on FIG. 1 only comprises two client devices 3 and 4, but the videoconference system 1 may as well comprise any number of client devices involved in the videoconference session without departing from the scope of the invention.

A first user uses the first client device 3 and a second user uses the second client device 4. The client devices may be in two different remote places or in the same place.

Each client device involved in the videoconference session comprises a microphone configured to capture the voice of the user of the client device and an audio speaker configured to render the voice of users of the remote client devices. At least two client devices involved in the videoconference session further comprise a camera configured to capture a video of the user of the client device and a video display configured to display a video from the user(s) of the remote client device(s).

Each client device exchanges audio and video streams of captured voice and video with the other client device through the videoconference server 2 in order that the users of the client devices may see and hear the other users through their personal client device, even if the users are in different places.

For example, the video and voice of the user of the client device 3 is played by the client device 4 and the video and voice of the user of the client device 4 is played by the client device 3.

The exchanges of audio and video streams of audio and video packets will be now described in more details.

The client devices, for example the first and the second client devices 3 and 4 pictured, are involved in a videoconference session through the videoconference server 2. In the videoconference session, the first client device 3 sends audio and video streams to the second client device 4 and the second client device 4 sends audio and video streams to the first client device 3. The audio and video streams comprise audio packets and associated video packets.

The audio packets and the video packets are Real Time Protocol (RTP) packets. The audio packets and the video packets comprise a packet header comprising control information and a packet body comprising the audio or video data content. The packet header namely comprises a sequence number, which indicates the sequential position of a packet in a stream of emitted packets. The packet header also comprises a timestamp which indicates the timing of emitting the packet. The packet body comprises encoded audio or video data which were captured during a time slot before emitting the packet. For example, video data of a packet comprises a sequence of images encoded by Red Green Blue (RGB) pixels and spatial coordinates, each image being captured per sub-time slot such that the concatenation of each sub-time slot is the time slot. For example, video data of a packet comprises a sequence of transition of images, wherein each transition is encoded by differences between two successive images, each captured during a sub-time slot.

The videoconference server 2 comprises a packet input interface 21 configured to receive audio and video packets from the client devices 3 and 4, and a packet output interface 22 configured to transmit audio and video packets to the client devices 3 and 4.

For the sake of illustration, the only streams of audio and video packets that are represented on FIG. 1 are an audio and video stream 5 emitted by the first client device 3 and an audio and video stream 6 transmitted by the videoconference server 2 to the second client device 4.

The audio and video stream 5 of audio and video packets received in the packet input interface 21 of the videoconference server 2 is split in an audio stream 7 and a video stream 8.

The audio stream 7 is routed to an audio mixer 9 and the video stream is routed to a video packet router 10.

The audio mixer 9 and the video packet router 10 and their functionalities will now be successively described.

The audio mixer 9 is a processing module dedicated to the processing of received audio streams of audio packets.

The audio mixer 9 is configured to mix the audio stream 7 with other audio streams. For the sake of illustration, another audio stream 11 is illustrated. The audio stream 11 is the audio part of an audio and video stream received from the second client device 4 (not represented).

The pictured resulting audio stream 12 is a mix of the audio streams 7 and 11. In other words, the resulting audio stream 12 is a stream of mixed audio packets from the audio packets of the audio streams 7 and 11. More precisely, an audio packet of the audio stream 7 is mixed with an audio packet of the audio stream 11 whose timestamp corresponds to the timestamp of the audio packet the audio stream 11 to generate an audio packet of the audio stream 12. The generated audio packet has a header comprising the timestamp of the mixed audio packets. Two corresponding timestamps are either identical or separated by a time value lower than a threshold.

The resulting audio stream 12 is transmitted by the audio mixer 9 to the output packet interface 22 in order to be routed to the second client user 4.

The audio mixer 9 is further configured to perform compression and decompression processing on the audio packets in order to mix the audio packets.

The videoconference server 2 further comprise an audio delay calculating module 13 configured to calculate an average audio processing delay introduced by the audio mixer 9 for the audio packets from the audio stream 7 and the audio packets from the audio stream 11. The average audio processing delay depends namely on di-jittering algorithm of audio, compression type, usage of Noise Reduction, and the audio mixing algorithm. The average audio processing delay is computed for each client device, namely for the client device 4. The average audio processing delay is sent to a client detection module 14.

The video packet router 10 and its functionalities will now be described.

The video packet router 10 is a processing module dedicated to the processing of received video streams of video packets.

For the sake of illustration, another video stream 15 is illustrated. The video stream 15 is the video part of an audio and video stream received from the second client device 4. For the sake of simplicity, the audio stream is not represented.

The video packet router 10 switches the video packets of the video stream 8 and 15.

In the pictured example, when the video packets are switched, the video packet router 10 selects the video stream corresponding to an active audio stream (i.e. the audio stream incoming from a client device whose user is currently speaking). After selecting the video stream between the video streams incoming from the different client devices, the video packet router 10 transmits the selected video stream to the client devices.

Selecting the video stream corresponding to the active audio stream is equivalent to selecting a subset of video packets received by the input interface.

In the pictured example, a resulting video stream 16 corresponds to the result of switching a video packet from the video stream 8 or a video packet of the other video stream 15.

The video packet router 10 also comprises a video buffer 17 configured to duplicate the resulting video stream 16 and to temporarily store a duplication of the video packets of the video stream 16.

Once duplicated, the resulting video stream 16 is transmitted by the video packet router 10 to the output packet interface 22 in order to be routed to the second client user 4.

The audio and video stream 6 transmitted by the videoconference server 2 to the second client device 4 comprises both the resulting audio stream 12 and the resulting video stream 16.

Alternatively, in a non-pictured example, the video packet router 10 is configured to route the video packets. The video packet router 10 routes both the video stream 15 and the video stream 8 to a third client device (not represented). The mixing of the video streams 15 and 8 is then performed by the third client device. The video packet router 10 may also comprise a video buffer 17. The video buffer 17 is configured to duplicate both the video stream 15 and the video stream 8 and to temporarily store a duplication of the video stream 15 and a duplication of the video stream 8. The video packet router 10 may also comprise one video buffer per connected client device, for example a first video buffer dedicated to the first client device, a second video buffer dedicated to the second client device and a third video buffer dedicated to the third client device. In this example, the first video buffer is configured to duplicate and store all the video packets of the video stream 8 and the second video buffer is configured to duplicate and store all the video packets of the video stream 15.

The processing of received audio and video stream by the client device 4 will now be described.

The client device 4 comprises an audio packet reader (not represented) for reconstituting the voices from reading the body of the audio packets of the audio stream 12, and an audio speaker (not represented) for rendering the reconstituted voices. The audio packets are read in real-time as the audio packets are received.

The client device 4 further comprises a video delay module 18 configured to receive a request 25 comprising the average audio processing delay from the client detection module 14 of the videoconference server 2.

The client device 4 further comprises a video buffer 19 configured to temporarily store the video packets of the video stream 16.

The client device 4 further comprises a video packet reader (not represented) for reconstituting the video from the reading of the video packets of the video stream 16, and a video display (not represented) for displaying the reconstituted video.

The video buffer 19 receives instructions 20 from the video delay module 18 in order to introduce the average audio processing delay in the video packets stored in the video buffer 19 in order to synchronize the displaying of each video packet with the rendering of the voices of each audio packet of corresponding timestamp.

The synchronization of the video packets with the audio packets is thus performed in the client device 4, and not in the videoconference server 2.

Recovery of Lost Video Packets

It may happen that a video packet of a video stream is lost at different stage of the travel between the first client device 3 and the second client device 4.

In order to recover a lost packet in a fast and efficient way, the videoconference server 2 and the client device 4 are equipped with loss detection and recovery functions.

The recovery of a lost video packet between the first client device 3 and the videoconference server 2 will now be described.

The videoconference server 2 comprises a packet loss detector 32 connected to the video packet router 10 in order to check if the sequence number of each received video packet is the successive sequence number expected, or not.

If the packet loss detector 32 detects that a sequence number is missing, then the packet loss detector 32 sends a request 33 to the first client device 3, the request comprising the missing sequence number or the previous sequence number and an instruction to re-send the missing video packet.

The client device 3 receives the request 33 and re-send the missing video packet to the videoconference server 2.

The recovery of a lost video packet between the videoconference server 2 and the second client device 4 will now be described.

The client device 4 comprises a packet loss detector 36 configured to check if the sequence number of each received video packet is the successive sequence number expected, or not.

If the packet loss detector 36 detects that a sequence number is missing, then the packet loss detector 36 sends a request 35 to the video buffer 17 of the videoconference server 2, the request comprising the missing sequence number or the previous sequence number and an instruction to re-send the missing video packet.

The video buffer 17 receives the request 35 and re-send the missing video packet to the second client device 4 if the missing video packet is available.

Optionally, when a packet loss occurs and is detected, the videoconference server 2 sends an inhibition request to the client device 4, wherein the inhibition request comprises an instruction to inhibit the introduction, by the video delay module 18, of the average audio processing delay in the recovered missing video packet.

Thanks to these features, the recovery delay is limited, because the videoconference server 2 detects a loss of a packet in an early manner. Moreover, the recovery delay is also limited as the lost packet is already stored in the video buffer 17.

The advantages of the early recovery of lost video packets on lip synchronization will now be described with reference to FIGS. 2 and 3.

Figure 2:
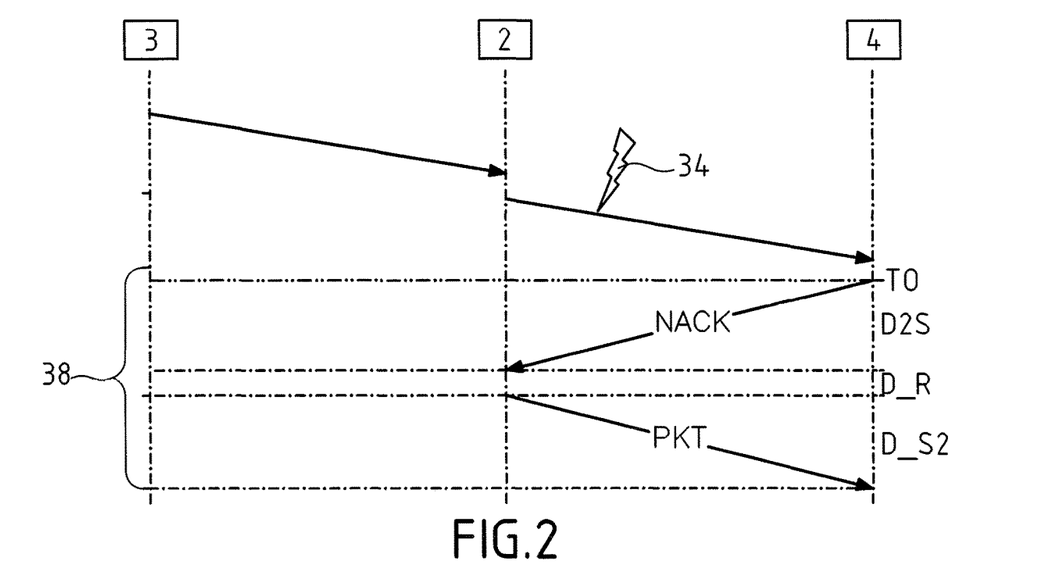
FIG. 2 schematically illustrates the transmission of a video packet between the first client device, the videoconference server and the second client device of FIG. 1, wherein the video packet is lost between the videoconference server and the second client device.

FIG. 2 schematically illustrates the transmission of a video packet between the first client device 3, the videoconference server 2 and the second client device 4 of the FIG. 1. As represented by the flash 34, the video packet is lost between the videoconference server 2 and the second client device 4.

The client device 4 detects the loss in a detection time T0 and sends a NACK request to the videoconference server 2 for recovery of the lost video packet. The NACK request between the client device 4 and the videoconference server 2 has a latency D2S. The videoconference server 2 retrieves the lost video packet in the video buffer 17 in a delay of recovery DR. Then, the videoconference server 2 sends the retrieved lost video packet PKT. The transmission of the video packet PKT has a latency DS2.

The total recovery time 38 is the addition of the detection time T0, latency D2S, delay of recovery DR and latency DS2.

The advantage of storing temporarily the video packets in the video buffer 17 of the videoconference server 2 is to avoid adding supplementary latency in the total recovery time as no retransmission is required from the first client device 3.

Figure 3:
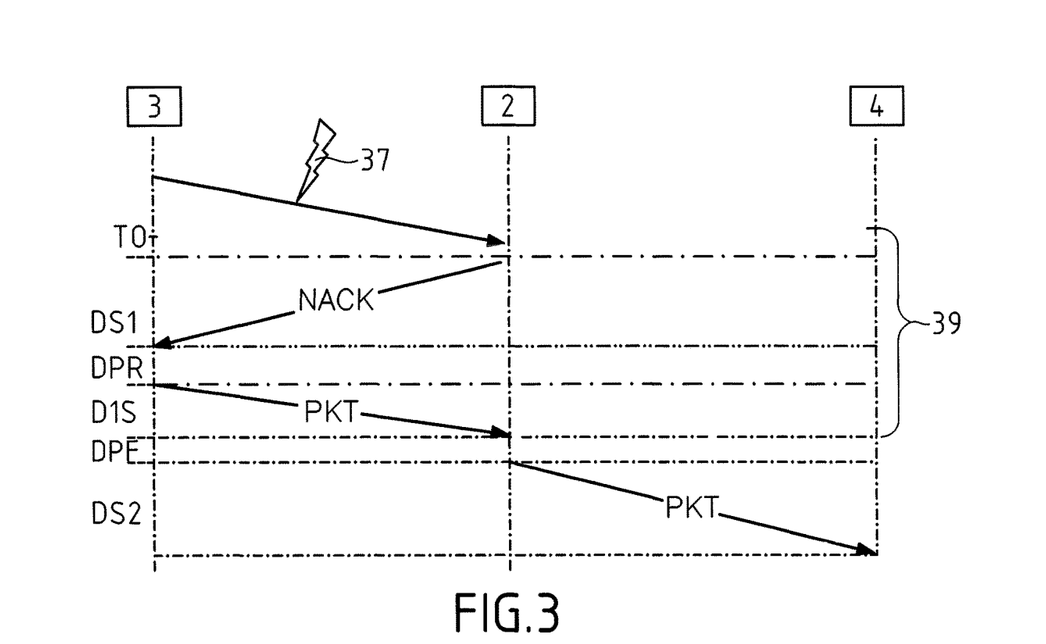
FIG. 3 schematically illustrates the transmission of a video packet between the first client device, the videoconference server and the second client device of the FIG. 1, wherein the video packet is lost between the first client device and the videoconference server.

FIG. 3 schematically illustrates the transmission of a video packet between the first client device 3, the videoconference server 2 and the second client device 4 of the FIG. 1. As represented by the flash 37, the video packet is lost between the first client device 3 and the videoconference server 2.

The videoconference server 2 detects the loss in a detection time T0 and sends a NACK request to the first client device 3 for recovery of the lost video packet. The NACK request between the videoconference server 2 and the first client device 3 has a latency DS1. The first client device 3 retrieves the lost video packet in a delay of recovery DPR. Then, the first client device 3 sends the retrieved lost video packet PKT. The transmission of the video packet PKT has a latency DS1. The videoconference server 2 forwards the retrieved video packet to the second client device 4 in a delay of packet forwarding DPF. The videoconference server 2 transmits the video packet PKT to the second client device 4 in a latency DS2.

The total recovery time 39 is the addition of the detection time T0, latency DS1, delay of recovery DPR and latency D1S.

The advantage of detecting that a video packet has been lost at an early stage, i.e. by the videoconference server 2, is to avoid adding supplementary latency in the total recovery time as no detection is needed from the second client device 4.

Figure 4:
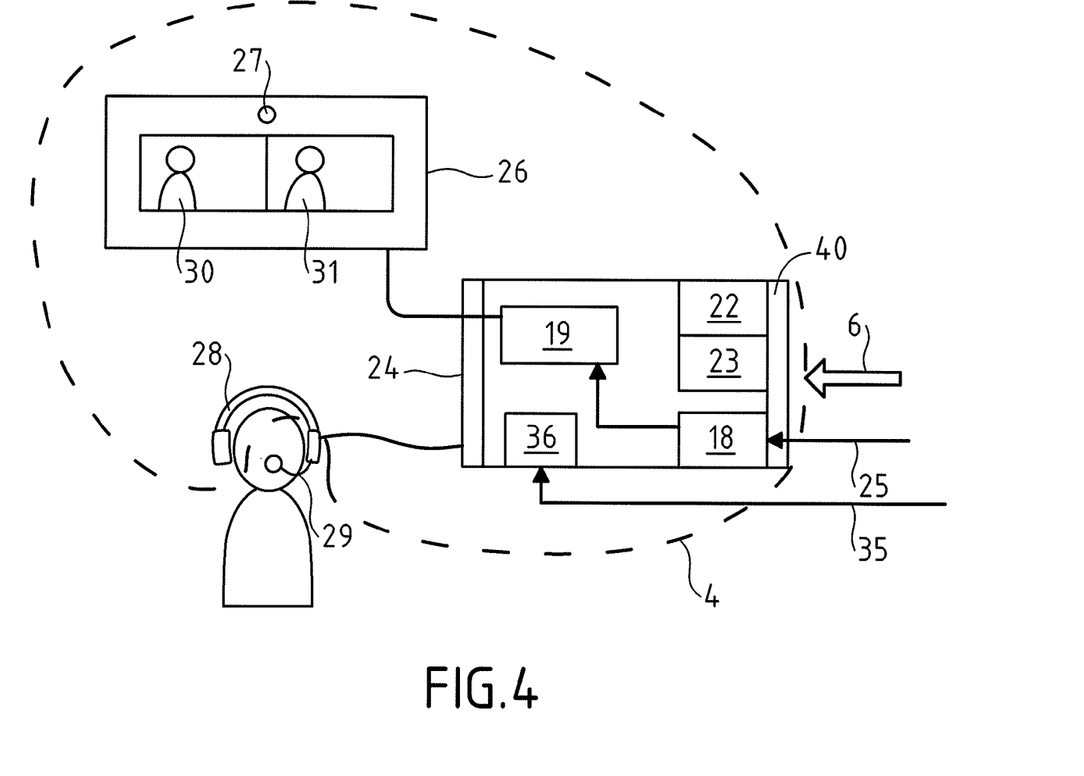
FIG. 4 schematically illustrates the second client device of FIG. 1.

The client device 4 is represented more in detail with reference to FIG. 4. The client device 4 further comprises a data repository 22 connected to a processing unit 23 and to a communication interface 40 for receiving the audio and video stream 6. The video delay module 18 is also connected to the communication interface 40 in order to receive the request 25 through the communication interface 40. The client device 4 also comprises a video display 26, for example a liquid crystal display (LCD) screen, a camera 27, for example a webcam, an audio speaker 28, for example an audio headset, and a microphone 29. The client device 4 also comprises an analog-to-digital and/or digital-to-analog converter 24 connected to the video display 26, camera 27, audio speaker 28 and a microphone 29. The processing unit 23 is configured to generate packets from the video and audio streams received from the converter 24 and to generate audio and video streams for the video display 26 and the audio headset 28 from the audio packets of the audio and video stream 6 and video packets of the video buffer 19.

As represented, the video display 26 displays a video of users 30, 31 participating to the videoconference involving the client device 3 and another client device. The mixed video packets of the received audio and video packets comprises a compositing of the captured videos of each user 30, 31 located in different geographical area.

Client Detection Functionality

Another functionality of the client detection module 14 will now be described in relation to FIG. 1.

The client detection module 14 of the videoconference server 2 is further configured to send a capable request to the client device 4, the capable request comprising instructions for detecting if the client device 4 is equipped with a video delay module 18.

If the client device 4 sends back an answer that the client device 4 is equipped with the client detection module 14, then the client detection module 14 sends periodically the request 25 in order to transmit an update of average audio processing delay in order that the client device 4 locally introduces the average audio processing delay to the received video packets for lip synchronization.

If the client device 4 sends back an answer that the client device 4 is not equipped with the client detection module 14, then the average audio processing delay is introduced in the video packets by the videoconference server 2.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several "means".

The client devices and the videoconference server described hereinabove may be implemented through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, central processing unit (CPU), digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. A client device described hereinabove may be implemented in a unitary manner or in a distributed manner. The videoconference server described hereinabove may be implemented in a unitary manner or in a distributed manner.

The videoconference server and the first client device may be collocated. The videoconference server and the first client device may be integrated in a single device.

In the claims, any reference signs placed between parentheses shall not be construed as limiting the scope of the claims.

The invention claimed is:

1. A videoconference server comprising:
a packet input interface configured to receive audio and associated video packets from a first client device;
a packet output interface configured to send the received audio and associated video packets to a second client device;
an audio processing module configured to, when the packet input interface receives an audio packet from the first client device:
process the audio packet,
calculate an average audio processing delay of audio packets intended to the second client device, and
associate the average audio processing delay to the second client device;
a client device configuration detection module configured to, prior to the initiation of a communication session with the second client device, send a configuration request to the second client device, and receive a configuration response from the second client device, the configuration response comprising an indication of whether the second client device is adapted to locally synchronize video packets with associated audio packets or not adapted; and
a video router comprising a video buffer configured to duplicate a video packet received by the packet input interface from the first client device, wherein the video packet is associated to the audio packet, and temporarily store the duplicated video packet in relation with an identification information of the video packet, the video router being further configured to:
receive a retrieving request from the second client device for retrieving a lost video packet, the retrieving request comprising an identification information of the video packet, and
retrieve the duplicated video packet associated with the identification information in the video buffer, the packet output interface being further configured to send the retrieved duplicated video packet to the second client device; and the videoconference server being further configured to, when the configuration response comprises an indication that the second client device is not adapted to locally synchronize video packets with associated audio packets: delay the received video packet by the calculated average audio processing delay prior to sending the received video packet to the second client device, and when the configuration response comprises an indication that the second client device is adapted to locally synchronize video packets with associated audio packets: send the average audio processing delay to the second client device in order that the second client device may synchronize a received video packet with the associated received audio packet.

2. The videoconference server according to claim 1, wherein the video router is further configured to detect that a video packet initially sent by the first client device is not received by the packet input interface, the video router being further configured to send a retrieving request to the first client device, and to recover from the first client device the initially sent video packet that has not been initially received.

3. The videoconference server according to claim 2, wherein the videoconference server is further configured to, upon detection that a video packet initially sent by the first client device is not received by the packet input interface, and the receipt of the configuration response that the second client device is adapted to locally synchronize video packets with associated audio packets, send an inhibition request to the second client device, wherein the inhibition request comprises an instruction to inhibit the introduction of the average audio processing delay in the recovered initially sent video packet that has not been initially received.

4. The videoconference server according to claim 1, wherein the audio packets are identified by audio packet identifiers and the associated video packets are identified by video packet identifiers, the video buffer being configured to detect that a video packet initially sent by the first client device is not received by the packet input interface by controlling the video packet identifier of a received video packet and by comparing the video packet identifier to an expected video packet identifier, wherein the expected video packet identifier is associated with the audio packet identifier of a received audio packet to which the expected video packet is associated.

5. The videoconference server according to claim 1, wherein the audio and video packets are each identified by a packet number, the packet number indicating the position of the packet in a sequence of emitted packets, wherein the retrieving request comprises the packet number of the video packet.

6. The videoconference server according to claim 1, wherein processing the audio packet comprises mixing the audio packet with other received audio packets.

7. The videoconference server according to claim 1, wherein the audio processing module is configured to periodically recalculate the average audio processing delay and to send the recalculated average audio processing delay to the second client device in order that the second client device may update the average audio processing delay used to synchronize a received video packet with the associated received audio packet.

8. The videoconference server according to claim 1, wherein the video buffer is a circular buffer.

9. The videoconference server according to claim 1, wherein the packets are Real Time Protocol (RTP) packets.

10. A method comprising:
receiving, by a videoconference server, an audio packet from a first client device;
processing the audio packet;
calculating an average audio processing delay of audio packets intended for a second client device;
associating the average audio processing delay to the second client device;
prior to the initiation of a communication session with a second client device, sending a configuration request to the second client device;
receiving a configuration response from the second client device, the configuration response comprising an indication of whether the second client device is adapted to locally synchronize video packets with associated audio packets or not adapted;
receiving, from the second client device, a retrieving request for retrieving a lost video packet, the retrieving request comprising an identification information of the video packet, wherein the videoconference server comprises a video buffer configured to:
duplicate a video packet received from the first client device, wherein the video packet is associated to the audio packet, and
temporarily store the duplicated video packet in relation with an identification information of the video packet;
retrieving the duplicated video packet associated with the identification information in the video buffer;
sending, to the second client device, the retrieved duplicated video packet;
when the configuration response comprises an indication that the second client device is not adapted to locally synchronize video packets with associated audio packets, delaying the received video packet by the calculated average audio processing delay prior to sending the received video packet to the second client device; and
when the configuration response comprises an indication that the second client device is adapted to locally synchronize video packets with associated audio packets, sending the average audio processing delay to the second client device in order that the second client device may synchronize a received video packet with the associated received audio packet.

11. The method according to claim 10, further comprising:
detecting that a video packet initially sent by the first client device was not initially received by the videoconference server;
sending a retrieving request to the first client device; and
recovering, from the first client device, the initially sent video packet that was not initially received.

12. The method according to claim 11, further comprising after detecting that a video packet initially sent by the first client device was not received by the videoconference server, and after receiving the configuration response that the second client device is adapted to locally synchronize video packets with associated audio packets, sending an inhibition request to the second client device, wherein the inhibition request comprises an instruction to inhibit the introduction of the average audio processing delay in the recovered initially sent video packet that was not initially received.

13. The method according to claim 10, wherein the audio packets are identified by audio packet identifiers and the associated video packets are identified by video packet identifiers, the video buffer being configured to detect that a video packet initially sent by the first client device is not received by the videoconference server by controlling the video packet identifier of a received video packet and by comparing the video packet identifier to an expected video packet identifier, wherein the expected video packet identifier is associated with the audio packet identifier of a received audio packet to which the expected video packet is associated.

14. The method according to claim 10, wherein the audio packet and the video packet are each identified by a packet number, the packet number indicating the position of each packet in a sequence of emitted packets, and wherein the retrieving request comprises the packet number of the video packet.

15. The method according to claim 10, wherein processing the audio packet comprises mixing the audio packet with other received audio packets.

16. The method according to claim 10, further comprising:
 periodically recalculating the average audio processing delay; and
 sending the recalculated average audio processing delay to the second client device in order that the second client device may update the average audio processing delay used to synchronize a received video packet with the associated received audio packet.

17. The method according to claim 10, wherein the video buffer is a circular buffer.

18. The method according to claim 10, wherein the packets are Real Time Protocol (RTP) packets.

\* \* \* \* \*